(12) United States Patent
Davis et al.

(10) Patent No.: US 12,349,253 B2
(45) Date of Patent: *Jul. 1, 2025

(54) CONTROL OF DYNAMIC BRIGHTNESS OF LIGHT-EMITTING DIODE ARRAY

(71) Applicant: MAGIC LEAP, INC., Plantation, FL (US)

(72) Inventors: Christopher F. Davis, Parkland, FL (US); Howard Russell Cohen, Weston, FL (US); Mihailo Slobodan Zivkovic, Plantation, FL (US); Marshall Charles Capps, Austin, TX (US)

(73) Assignee: Magic Leap, Inc., Danville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,700

(22) Filed: Apr. 25, 2024

(65) Prior Publication Data

US 2024/0276615 A1    Aug. 15, 2024

Related U.S. Application Data

(63) Continuation of application No. 17/977,648, filed on Oct. 31, 2022, now Pat. No. 11,991,805, which is a
(Continued)

(51) Int. Cl.
*H05B 45/46* (2020.01)
*H05B 45/10* (2020.01)

(52) U.S. Cl.
CPC ............. *H05B 45/46* (2020.01); *H05B 45/10* (2020.01)

(58) Field of Classification Search
CPC ........ H05B 45/46; H05B 45/10; H05B 45/20; H05B 45/48; G09G 3/32; G09G 3/3406;
(Continued)

(56) References Cited

U.S. PATENT DOCUMENTS 8,638,045 B2 *  1/2014  Kunst ................. H05B 45/385
                                                    315/185 S
8,890,415 B2   11/2014  Zhang
(Continued)

FOREIGN PATENT DOCUMENTS

JP    2012-028573 A    2/2012
JP    2013-522837 A    6/2013
(Continued)

OTHER PUBLICATIONS

PCT International Search Report and Written Opinion in International Appln No. PCT/US2020/066125, dated Mar. 23, 2021, 11 pages.

*Primary Examiner* — Minh D A
(74) *Attorney, Agent, or Firm* — Zi Y. Wong; Via LLP

(57) ABSTRACT

An apparatus includes a light-emitting diode (LED) driver circuit, one or more LEDs of an LED array, and an electronic switching circuit. The LED driver circuit is configured to generate an electric current. The one or more LEDs are electrically connected to the LED driver circuit. The electronic switching circuit is electrically connected to the one or more LEDs and configured to be placed in one of multiple switching configurations. The electronic switching circuit is further configured to direct a portion of the electric current away from the one or more LEDs, such that a remaining portion of the electric current drives the one or more LEDs. The portion of the electric current corresponds to the one of the multiple switching configurations.

15 Claims, 7 Drawing Sheets

Related U.S. Application Data continuation of application No. 17/126,592, filed on Dec. 18, 2020, now Pat. No. 11,497,097.

(60) Provisional application No. 62/950,324, filed on Dec. 19, 2019.

(58) Field of Classification Search
CPC .............. G09G 5/10; G09G 2320/0626; G02F 1/133601; G02F 1/133603
See application file for complete search history.

(56) References Cited

U.S. PATENT DOCUMENTS

| | | | |
|---|---|---|---|
| 10,914,640 | B2 | 2/2021 | Capps |
| 11,497,097 | B2 | 11/2022 | Davis et al. |
| 11,991,805 | B2* | 5/2024 | Davis .................... H05B 45/46 |
| 2008/0100232 | A1* | 5/2008 | Miguchi ................ H05B 45/38 307/31 |
| 2008/0106251 | A1 | 5/2008 | Cabral et al. |
| 2009/0015172 | A1 | 1/2009 | Huang et al. |
| 2010/0308743 | A1 | 12/2010 | Liang et al. |
| 2011/0068701 | A1 | 3/2011 | Van et al. |
| 2011/0080110 | A1 | 4/2011 | Nuhfer et al. |
| 2013/0099686 | A1 | 4/2013 | Ge et al. |
| 2013/0106298 | A1 | 5/2013 | Datta et al. |
| 2014/0184076 | A1 | 7/2014 | Murphy |
| 2014/0368129 | A1 | 12/2014 | Fukuda et al. |
| 2015/0123572 | A1 | 5/2015 | Takeda et al. |
| 2015/0257225 | A1 | 9/2015 | Yu et al. |
| 2016/0007420 | A1 | 1/2016 | Gong et al. |
| 2016/0044759 | A1 | 2/2016 | Lai et al. |
| 2017/0182935 | A1 | 6/2017 | Wieczorek et al. |
| 2017/0245339 | A1 | 8/2017 | Modepalli et al. |
| 2018/0035502 | A1 | 2/2018 | Raniero et al. |
| 2018/0263089 | A1 | 9/2018 | Seyler et al. |
| 2019/0032864 | A1 | 1/2019 | Xiong et al. |
| 2019/0086727 | A1 | 3/2019 | Dibbad et al. |
| 2019/0317271 | A1 | 10/2019 | Inoue |
| 2019/0327805 | A1 | 10/2019 | Ren et al. |
| 2019/0364627 | A1* | 11/2019 | Takeguchi ............. H05B 45/24 |
| 2021/0195710 | A1 | 6/2021 | Davis |
| 2023/0052511 | A1 | 2/2023 | Davis |

FOREIGN PATENT DOCUMENTS

| | | |
|---|---|---|
| JP | 2014-053138 A | 3/2014 |
| WO | 2014/087874 A1 | 6/2014 |

* cited by examiner

```
┌─────────────────────────────────────────────────────────────────┐
│ Place, by a controller circuit, a first programmable light-emitting diode (LED) driver │
│              circuit in one of a first set of configurations                            │
│                                   704                                                   │
└─────────────────────────────────────────────────────────────────┘
```
```
┌─────────────────────────────────────────────────────────────────┐
│  Generate, by the first programmable LED driver circuit, a first electric current      │
│          corresponding to the one of the first set of configurations                    │
│                                   708                                                   │
└─────────────────────────────────────────────────────────────────┘
```
```
┌─────────────────────────────────────────────────────────────────┐
│   Place, by a controller circuit, a second programmable LED driver circuit in a        │
│           second one of a second set of configurations                                  │
│                                   712                                                   │
└─────────────────────────────────────────────────────────────────┘
```
```
┌─────────────────────────────────────────────────────────────────┐
│  Generate, by the second programmable LED driver circuit, a second electric            │
│  current corresponding to the second one of the second set of configurations           │
│                                   716                                                   │
└─────────────────────────────────────────────────────────────────┘
```
```
┌─────────────────────────────────────────────────────────────────┐
│  Combine, by an electrical network, the first electric current and the second electric │
│   current into a third electric current to drive one or more LEDs of the electronic     │
│                                  display                                                │
│                                   720                                                   │
└─────────────────────────────────────────────────────────────────┘
```

FIG. 7

CONTROL OF DYNAMIC BRIGHTNESS OF LIGHT-EMITTING DIODE ARRAY

CROSS-REFERENCE TO RELATED APPLICATIONS

This application is a continuation of U.S. application Ser. No. 17/977,648, filed on Oct. 31, 2022, which is a continuation of U.S. application Ser. No. 17/126,592, filed on Dec. 18, 2020 (now U.S. patent Ser. No. 11/497,097, issued Nov. 8, 2022), which claims priority to U.S. Application Ser. No. 62/950,324, filed on Dec. 19, 2019, which are hereby incorporated by reference in their entirety.

TECHNICAL FIELD

This disclosure relates to methods and apparatuses for controlling the dynamic brightness of a light-emitting diode (LED) array, such as in an electronic display or an LED lighting system.

BACKGROUND

Traditional lighting controller circuits used to drive electronic displays and other lighting systems sometimes provide a relatively narrow range of brightness. The narrow range of brightness can affect user experience especially when projecting light under dim ambient light conditions where less overall brightness is desired. Moreover, electronic displays or other lighting systems that are too bright can increase the power consumption as well as increase the visibility of optical artifacts.

SUMMARY

Innovative aspects of the subject matter described in this specification include methods and apparatuses for controlling a light-emitting diode (LED) array. An apparatus for controlling an LED array includes an LED driver circuit, one or more LEDs of the LED array, and an electronic switching circuit. The LED driver circuit is configured to generate an electric current. The one or more LEDs are electrically connected to the LED driver circuit. The electronic switching circuit is electrically connected to the one or more LEDs and configured to be placed in one of multiple switching configurations. The electronic switching circuit is further configured to direct a portion of the electric current away from the one or more LEDs, such that a remaining portion of the electric current drives the one or more LEDs. The portion of the electric current corresponds to the one of the multiple switching configurations.

Innovative aspects of the subject matter described in this specification further include methods and apparatuses for controlling an LED array. An apparatus for controlling an LED array includes one or more LEDs of the LED array, a first programmable LED driver circuit electrically connected to the one or more LEDs, and a second programmable LED driver circuit electrically connected to the one or more LEDs. The first programmable LED driver circuit is configured to be placed in one of a first set of configurations. The first programmable LED driver circuit is further configured to generate a first electric current corresponding to the one of the first set of configurations. The second programmable LED driver circuit is configured to be placed in a second one of a second set of configurations. The second programmable LED driver circuit is further configured to generate a second electric current corresponding to the second one of the second set of configurations. The first electric current and the second electric current are combined into a third electric current to drive the one or more LEDs.

Among other benefits and advantages, the embodiments disclosed herein increase the range of dynamic brightness of a red-green-blue (RGB) LED array compared to traditional methods by decreasing the minimum brightness limits of LEDs that are powered by an LED driver circuit. The embodiments provide an improved user experience for users of RGB displays, especially under conditions of dim lighting. The embodiments also enable lower power consumption compared to traditional LED controllers by extending the dynamic range of display brightness.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 7 is a flowchart showing operations in methods for controlling an LED array.

DETAILED DESCRIPTION

Figure 1:
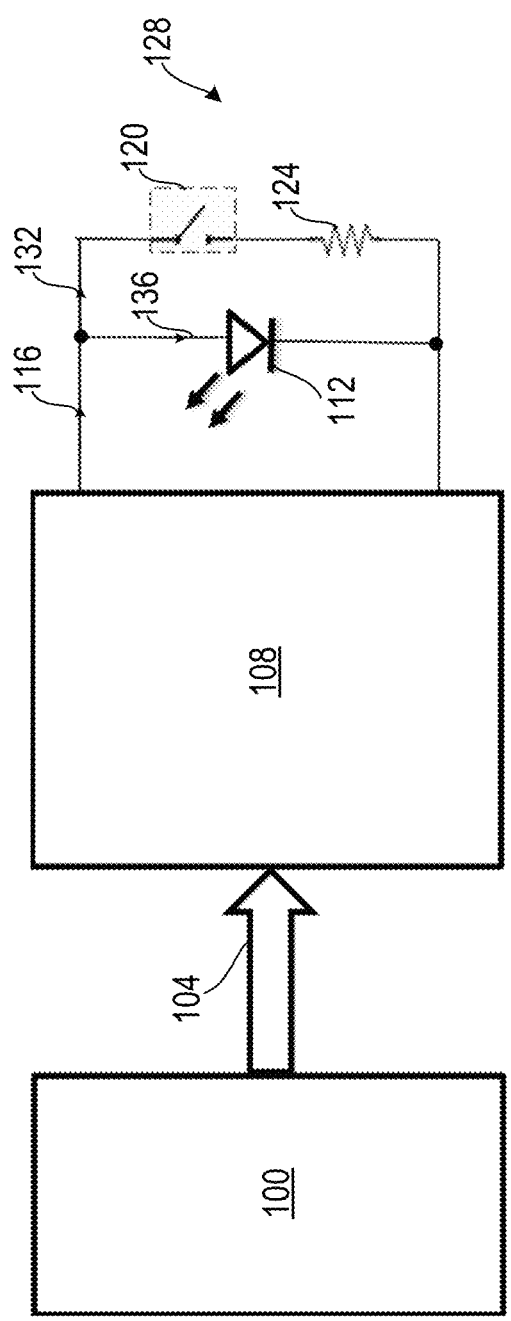
FIG. 1 illustrates an apparatus for controlling a light-emitting diode (LED) array.

FIG. 1 illustrates an apparatus for controlling a light-emitting diode (LED) array. An LED array can be used in an electronic display, such as in a device (e.g., headset) that provides a virtual reality, augmented reality, or mixed reality experience. An LED array can also be used to provide illumination in aviation lighting systems, automotive headlamps, traffic signals, cameras, medical devices, and/or other suitable systems. The apparatus illustrated in FIG. 1 includes a controller circuit 100, an LED driver circuit 108, one or more LEDs 112 of the LED array, and an electronic switching circuit 128. The LED driver circuit 108 is configured to generate an electric current 116 to power the one or more LEDs 112. In some embodiments, the electric current 116 generated by the LED driver circuit 108 is in a range from 20 mA to 400 mA. The amount of the electric current 116 will depend on the type of the LED driver circuit 108 used. The one or more LEDs 112 are electrically connected to the LED driver circuit 108 to be powered by the LED driver circuit 108.

The electronic switching circuit 128 includes an electronic switch 120 and a resistor 124. The electronic switching circuit 128 is electrically connected to the one or more LEDs 112. The electronic switching circuit 128 is configured to be placed in one of multiple switching configurations. For example, when the electronic switch 120 is open, the electronic switching circuit 128 is placed in a first switching configuration in which the electric current 116 flows through the one or more LEDs 112 to drive the one or more LEDs 112 one at a time. Each LED of the one or more LEDs 112 is connected to a separate pulldown circuit within the LED driver circuit 108. In some embodiments, the controller circuit 100 is configured to generate control signals 104 that activate only one of the one or more pulldown circuits at a time. Hence, only one of the one or more pulldown circuits is active at a time. Hence, only one of the one or more LEDs 112 is driven at a time.

When the electronic switch 120 is closed, the electronic switching circuit 128 is placed in a second switching configuration. In the second switching configuration, the electronic switching circuit 128 is configured to direct a portion 132 of the electric current 116 away from the one or more LEDs 112 and through the resistor 124. A remaining portion 136 of the electric current 116 drives the one or more LEDs 112. The portion 132 of the electric current 116 corresponds to the switching configuration that the electronic switching circuit 128 is placed in. For example, in the first switching configuration, the portion 132 is zero. In the second switching configuration when the electronic switch 120 is closed, the portion 132 corresponds to the voltage drop across the electronic switching circuit 128 divided by a resistance of the resistor 124. In some embodiments, the remaining portion 136 of the electric current 116 is in a range from 0 mA to 380 mA. Hence, the brightness of each LED of the 112 is decreased when driven by the remaining portion 136 instead of the electric current 116.

In the apparatus illustrated in FIG. 1, each LED of the one or more LEDs 112 has a first brightness responsive to being driven by the electric current 116. When the electronic switching circuit 128 is not used, the minimum brightness limit of the LED array corresponds to the minimum limit on the electric current 116 generated by the LED driver circuit 108. Each LED of the one or more LEDs 112 has a second brightness responsive to being driven by the remaining portion 136 of the electric current 116. When the electronic switching circuit 128 is used, the minimum brightness limit of the LED array corresponds to the minimum limit on the remaining portion 136 of the electric current 116. The remaining portion 136 of the electric current 116 is less than the electric current 116. Hence, the second brightness is less than the first brightness. Therefore, when the electronic switching circuit 128 is used, the minimum brightness limit of the LED array is reduced compared to when the electronic switching circuit 128 is not used.

Figure 2:
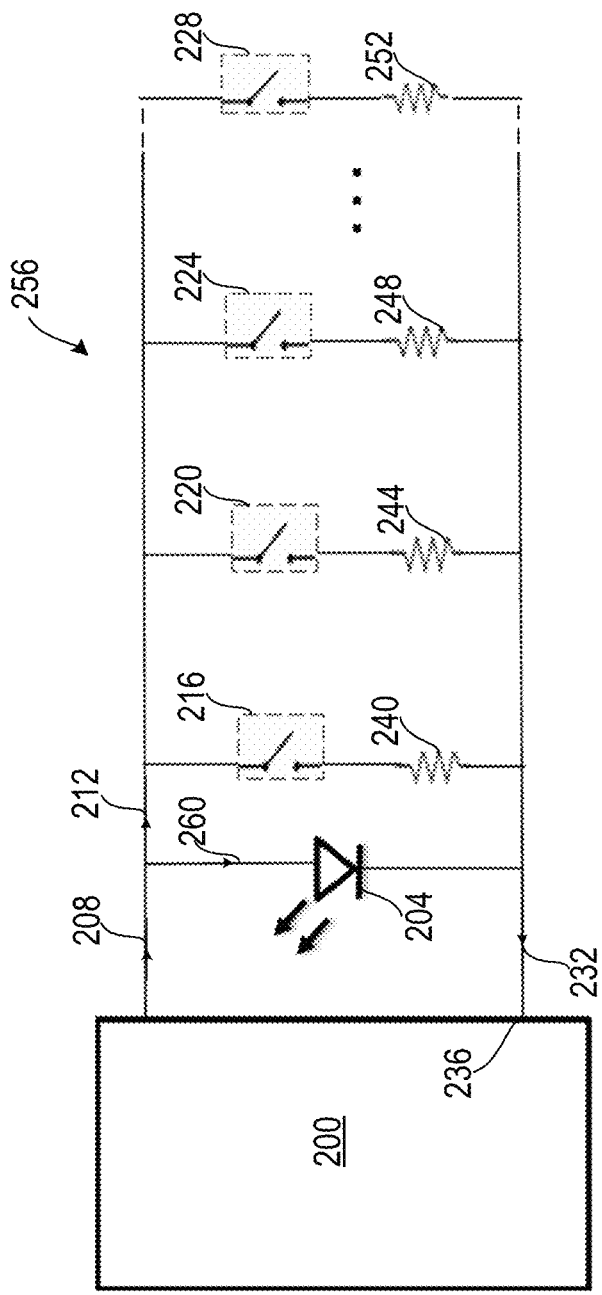
FIG. 2 illustrates an apparatus for controlling an LED array.

FIG. 2 illustrates an apparatus for controlling an LED array. The apparatus illustrated in FIG. 2 includes an LED driver circuit 200, one or more LEDs 204 of the LED array, and an electronic switching circuit 256. The LED driver circuit 200 is configured to generate an electric current 208 to power the one or more LEDs 204. The one or more LEDs 204 are electrically connected to the LED driver circuit 200 to be powered by the LED driver circuit 200.

The electronic switching circuit 256 is electrically connected to the one or more LEDs 204. In some embodiments, the electronic switching circuit 256 includes multiple electronic switches (216, 220, 224, . . . , 228) electrically connected in a first parallel configuration. The electronic switching circuit 256 further includes multiple resistors (240, 244, 248, . . . , 252) electrically connected in a second parallel configuration. Each electronic switch, for example, the electronic switch 216, is electrically connected to one or more corresponding resistors, for example the resistor 240.

The multiple electronic switches are configured to place the electronic switching circuit 256 in one of multiple switching configurations. The electronic switching circuit 256 is configured to be placed in a particular switching configuration by closing different combinations of the multiple electronic switches. In each switching configuration, the electronic switching circuit 256 directs a portion 212 of the electric current 208 away from the one or more LEDs 204, such that a remaining portion 260 of the electric current 208 drives the one or more LEDs 204. The portion 212 of the electric current 208 corresponds to the switching configuration that the electronic switching circuit 256 has been placed in.

The resistors (240, 244, 248, . . . , 252) are electrically connected to the multiple electronic switches (216, 220, 224, . . . , 228) and configured to direct the portion 212 of the electric current to a port 236 of the LED driver circuit 200. The portion 212 of the electric current 208 flowing through one or more of the resistors (240, 244, 248, . . . , 252) and the remaining portion 260 of the electric current 208 driving the one or more LEDs 204 are combined into an electric current 232 and directed to the port 236 of the LED driver circuit 200.

In some embodiments, the electronic switching circuit 256 includes N electronic switches, wherein N is greater than or equal to 1. For example, N can be 1, 17, 124, etc., The electronic switching circuit 256 can thus be placed in one of $2^N$ switching configurations at a time by closing different combinations of the electronic switches. For example, consider an embodiment in which N is 4. In a first switching configuration, all the four electronic switches (216, 220, 224, 228) are open and the portion 212 of the electric current 208 is zero. In a second switching configuration, the electronic switch 216 is closed and the remaining three electronic switches (220, 224, 228) are open. In a third switching configuration, the electronic switches 216, 220 are closed and the electronic switches 224, 228 are open. In a sixteenth switching configuration, all the four electronic switches (216, 220, 224, 228) are closed.

The portion 212 of the electric current 208 varies in accordance with the switching configuration that the electronic switching circuit 256 is placed in. For example, the portion 212 of the electric current 208 varies in accordance with the resistance of the electronic switching circuit 256. Hence, the remaining portion 260 of the electric current 208 varies in accordance with the switching configuration that the electronic switching circuit 256 is placed in. Because the brightness of each LED of the one or more LEDs 204 varies in accordance with the remaining portion 260 of the electric current 208, the brightness of each LED varies in accordance with the switching configuration that the electronic switching circuit 256 is placed in. By closing different combinations of the electronic switches (216, 220, 224, 228), the brightness of the LED array is varied.

In some embodiments, the electronic switching circuit 256 includes one or more variable resistors. For example, one or more of the resistors (240, 244, 248, . . . , 252) can be a variable resistor. The resistance of each variable resistor can be adjusted by a controller circuit, such as the controller circuit 100 illustrated in FIG. 1. Hence, the portion 212 of the electric current 208 can be adjusted by adjusting the resistance of each variable resistor.

Figure 3:
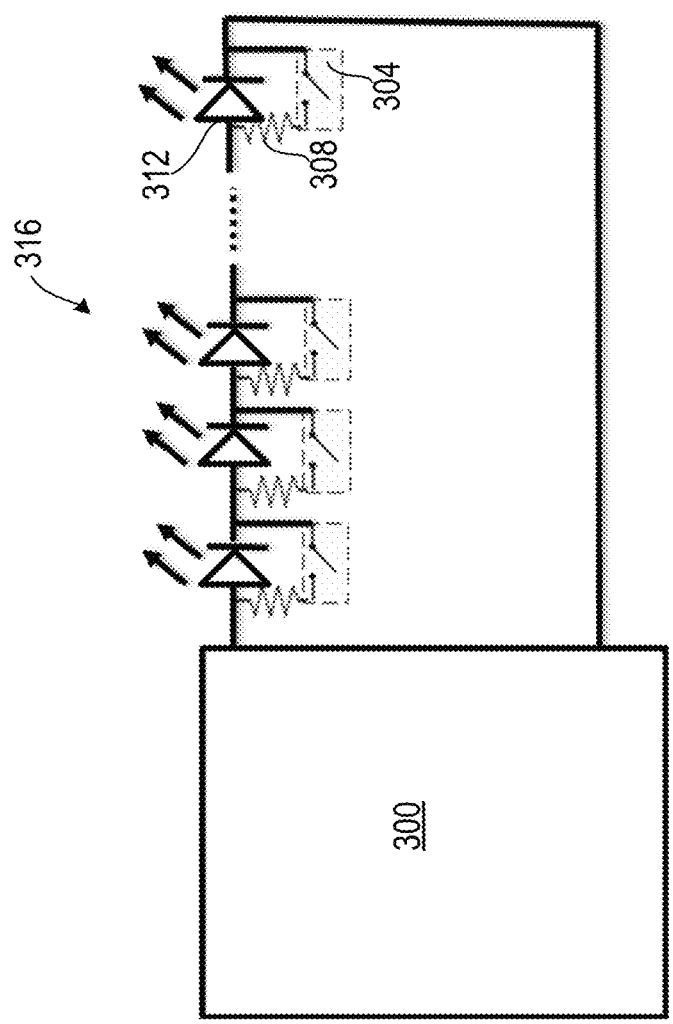
FIG. 3 illustrates an apparatus for controlling an LED array.

FIG. 3 illustrates an apparatus for controlling an LED array. The apparatus illustrated in FIG. 3 includes an LED driver circuit 300, one or more LEDs 312 of the LED array, and an electronic switching circuit 316. The LED driver circuit 300 is configured to generate an electric current to power the one or more LEDs 312. The one or more LEDs 312 are electrically connected to the LED driver circuit 300 to be powered by the LED driver circuit 300.

The electronic switching circuit 316 includes one or more electronic switches 304 and one or more resistors 308. The one or more LEDs 312 are electrically connected to each other in a series configuration. Each electronic switch of the one or more electronic switches 304 is electrically connected to a corresponding LED of the one or more LEDs 312 and a corresponding resistor of the one or more resistors 308. When a particular electronic switch of the one or more electronic switches 304 is closed, the electronic switching circuit 316 directs a portion of the electric current away from the corresponding LED, such that a remaining portion of the electric current drives the corresponding LED. Hence, a brightness of the corresponding LED is reduced compared to the brightness of the corresponding LED when the particular switch is open. Hence, the brightness of the LED array can be varied by closing different combinations of the one or more electronic switches 304.

Figure 4:
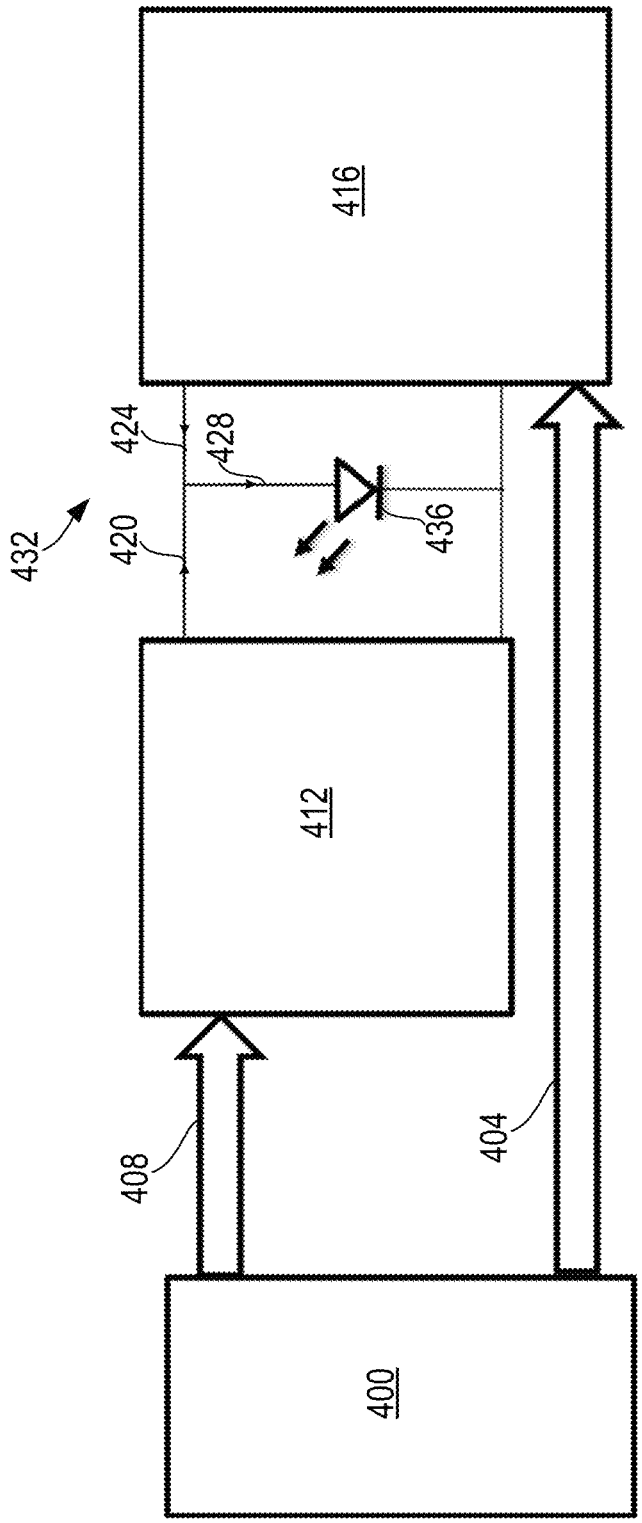
FIG. 4 illustrates an apparatus for controlling an LED array.

FIG. 4 illustrates an apparatus for controlling an LED array. The apparatus illustrated in FIG. 4 includes one or more LEDs 436 of the LED array, a first programmable LED driver circuit 412, a second programmable LED driver circuit 416, and a controller circuit 400. The first programmable LED driver circuit 412 is electrically connected to the one or more LEDs 436 and configured to power the one or more LEDs 436. The first programmable LED driver circuit 412 is configured to be placed in one of a first set of configurations. In each of the first set of configurations, the first programmable LED driver circuit 412 generates a first electric current 420 to power the one or more LEDs 436. The first electric current 420 corresponds to the configuration that the first programmable LED driver circuit 412 is placed in. The controller circuit 400 is electrically connected to the first programmable LED driver circuit 412. The controller circuit 400 is configured to place the first programmable LED driver circuit 412 in each of the first set of configurations to adjust the first electric current 420. For example, the controller circuit 400 generates control signals 408 that place the first programmable LED driver circuit 412 in each configuration.

The second programmable LED driver circuit 416 is configured to be placed in a second one of a second set of configurations. In each of the second set of configurations, the second programmable LED driver circuit 416 generates a second electric current 424 to power the one or more LEDs 436. The second electric current 424 corresponds to the configuration that the second programmable LED driver circuit 416 is placed in. The controller circuit 400 is electrically connected to the second programmable LED driver circuit 416. The controller circuit 400 is configured to place the second programmable LED driver circuit 416 in each of the second set of configurations to adjust the second electric current 424. For example, the controller circuit 400 generates control signals 404 that place the second programmable LED driver circuit 416 in each configuration.

A brightness of each LED of the one or more LEDs 436 varies in accordance with the first electric current 420. The first electric current 420 varies in accordance with each configuration of the first set of configurations. Hence, the brightness of each LED of the one or more LEDs 436 varies in accordance with each configuration that the first programmable LED driver circuit 412 is placed in. The brightness of each LED of the one or more LEDs 436 also varies in accordance with the second electric current 424. The second electric current 424 varies in accordance with each configuration of the second set of configurations. Hence, the brightness of each LED of the one or more LEDs 436 varies in accordance with each configuration that the second programmable LED driver circuit 416 is placed in. By controlling the configurations that the first programmable LED driver circuit 412 and the second programmable LED driver circuit 416 are placed in, using the controller circuit 400, the brightness of the LED array can be adjusted.

The first electric current 420 and the second electric current 424 are combined into a third electric current 428 to drive the one or more LEDs 436. For example, the first electric current 420 can be in a range from 1 mA to 50 mA. The second electric current 424 can be in a range from 50 mA to 500 mA. The third electric current 428 can be in a range from 1 mA to 550 mA. Each LED of the one or more LEDs 426 has a first minimum brightness responsive to being driven by the first electric current 420 (for example, 1 mA). Each LED of the one or more LEDs 436 has a second minimum brightness responsive to being driven by the second electric current 424 (for example, 50 mA). Each LED of the one or more LEDs 436 has a third minimum brightness responsive to being driven by the third electric current 428 (for example, 1 mA). The third minimum brightness is a lesser of the first minimum brightness and the second minimum brightness.

Each LED of the one or more LEDs 436 has a first maximum brightness responsive to being driven by the first electric current 420 (for example, 50 mA). Each LED of the one or more LEDs 436 has a second maximum brightness responsive to being driven by the second electric current 424 (for example, 500 mA). Each LED of the one or more LEDs 436 has a third maximum brightness responsive to being driven by the third electric current 428 (for example, 550 mA). The third maximum brightness is a greater of the first maximum brightness and the second maximum brightness.

The one or more LEDs include at least a first LED having a first color (for example, red) and a second LED having a second color (for example, green). The first color is different from the second color. One or more blue LEDs can also be used to construct the LED array. In some embodiments, the controller circuit 400 programs at least one of the first programmable LED driver circuit 412 or the second programmable LED driver circuit 416 to adjust a brightness of each LED of the one or more LEDs 436 within one frame cycle. The frame cycle corresponds to the cycle rate or image frame rate of an electronic display or lighting system using the one or more LEDs 436. In other embodiments, the controller circuit 400 synchronizes a change to a brightness of each LED of the one or more LEDs 436 to an output of an electronic display or a lighting system using the one or more LEDs 436. For example, in a virtual reality game displayed on a virtual reality headset using the one or more LEDs 436, the controller circuit 400 can synchronize a decrease in a brightness of an LED to the display of a particular image on the headset.

Figure 5:
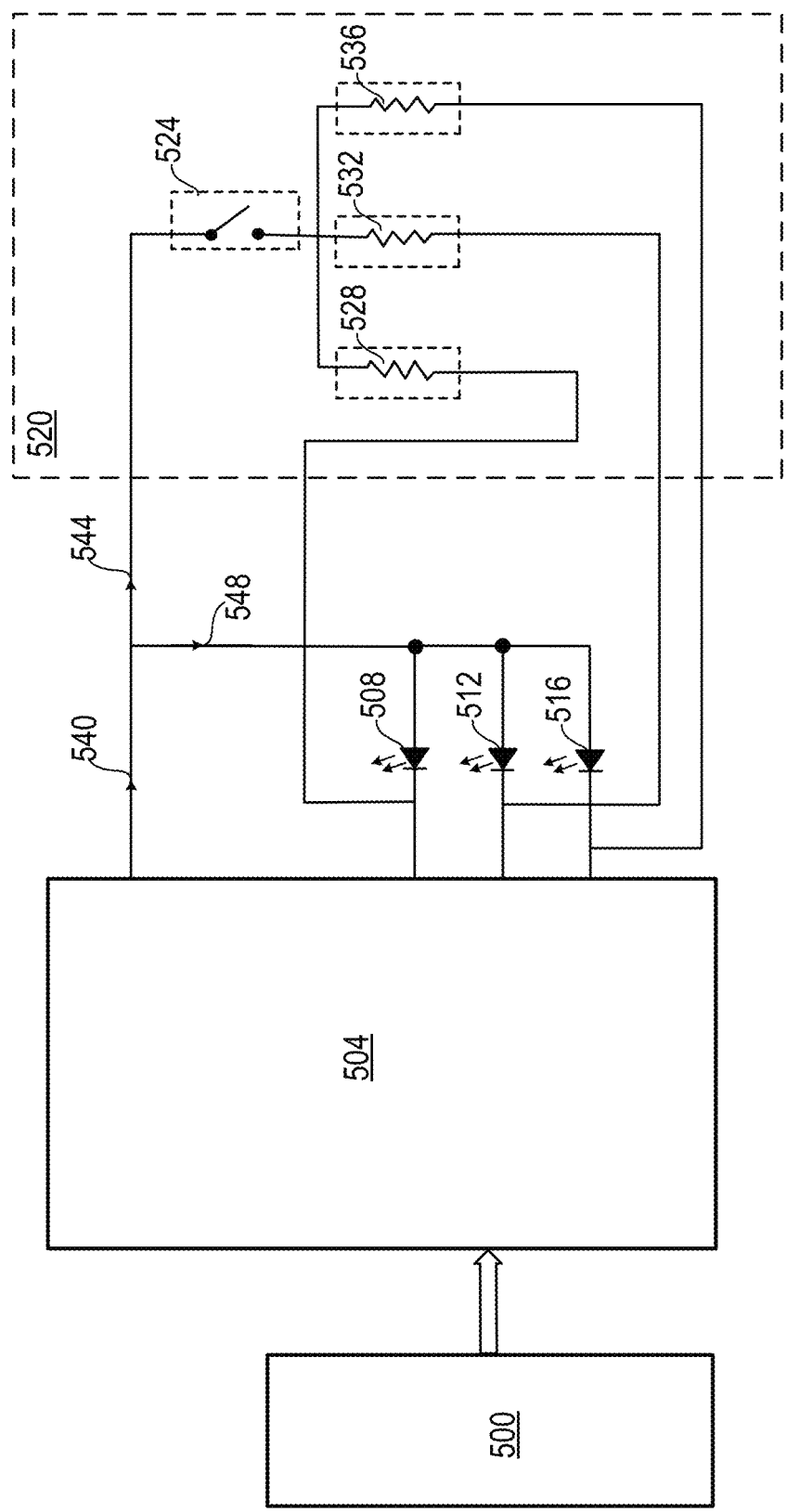
FIG. 5 illustrates an apparatus for controlling an LED array.

FIG. 5 illustrates an apparatus for controlling an LED array. The apparatus illustrated in FIG. 5 includes a controller circuit 500, an LED driver circuit 504, a red LED 508, a green LED 512, a blue LED 516, and an electronic switching circuit 520. The electronic switching circuit 520 includes an electronic switch 524, and three resistors 528, 532, 536. In some embodiments, the apparatus illustrated in FIG. 5 is used to control a lighting system having an LED array with two or more unique colors, for example, violet, amber, white, etc.

The LED driver circuit 504 is configured to generate an electric current 540 to power the LEDs 508, 512, 516. The controller circuit 500 controls and operates the LED driver circuit 504 to adjust an amount of the electric current 540 generated. The LEDs 508, 512, 516 are electrically connected to the LED driver circuit 504 to be powered by the LED driver circuit 504. The electronic switching circuit 520 is electrically connected to the LEDs 508, 512, 516. The electronic switching circuit 520 is configured to be placed in one of two switching configurations. For example, when the electronic switch 524 is open, the electronic switching circuit 520 is placed in a first switching configuration. When the electronic switch 524 is closed, the electronic switching circuit 520 is placed in a second switching configuration.

The electronic switching circuit 520 directs a portion 544 of the electric current 540 away from the LEDs 508, 512, 516, such that a remaining portion 548 of the electric current 540 drives each of the LEDs 508, 512, 516. The portion 544 of the electric current 540 corresponds to the switching configuration that the electronic switching circuit 520 is placed in. For example, in the first configuration, the portion 544 of the electric current 540 is zero.

When the red LED 508 is driven in the second switching configuration, the portion 544 of the electric current 540 corresponds to the voltage drop across the red LED 508 divided by a resistance of the resistor 528. When the green LED 512 is driven in the second switching configuration, the portion 544 of the electric current 540 corresponds to the voltage drop across the green LED 512 divided by a resistance of the resistor 532. When the blue LED 516 is driven in the second switching configuration, the portion 544 of the electric current 540 corresponds to the voltage drop across the blue LED 516 divided by a resistance of the resistor 536. The remaining portion 548 of the electric current 540 driving each of the LEDs 508, 512, 516 is, therefore, always less than the electric current 540 when the electronic switch is closed. For example, when the electric current 540 generated by the LED driver circuit 504 is in a range from 20 mA to 400 mA, the remaining portion 548 of the electric current 540 is in a range from 0 mA to 380 mA. The minimum brightness of the LEDs 508, 512, 516 in the second configuration (when the electronic switching circuit 520 is used) is, therefore, less than the minimum brightness of the LEDs 508, 512, 516 when electronic switching circuit 520 is not used. The apparatus illustrated in FIG. 5 thus provides a lower minimum brightness, greater dynamic brightness range, and improved sensitivity control for the LED array as compared to traditional methods.

In some embodiments, the brightness and color characteristics of an electronic display (or other lighting system) using the apparatuses illustrated in FIGS. 1-5 can be adjusted by characterizing the temperature and current dependence of each LED and adjusting the manner in which the electronic display receives and handles the emitted light from the LEDs based on the characterization. These two steps are sometimes referred to as "thermal calibration" or "color calibration" of the electronic display. The characterization step can occur during or after fabrication, e.g., while the electronic display is still in the factory, by positioning a light detection device (e.g., a spectrometer) at a distance from the eyepiece where the user's eye would receive the light when the device is in use. The light detection device sequentially detects each LED's output light through the electronic display as while a controller (e.g., a feed forward controller) iterates through multiple temperatures and currents. The output light of the LEDs is analyzed to extract chromaticity and luminance data that are used to characterize each LED. When the electronic display is in actual use by the user, the calibration step is performed by measuring a temperature and adjusting the LED current and the color computation algorithm based on the characterization data as informed by the measured temperature. Details of the calibration process and the feed forward control are disclosed in U.S. patent application Ser. No. 16/530,599, which is incorporated by reference herein in its entirety.

Figure 6:
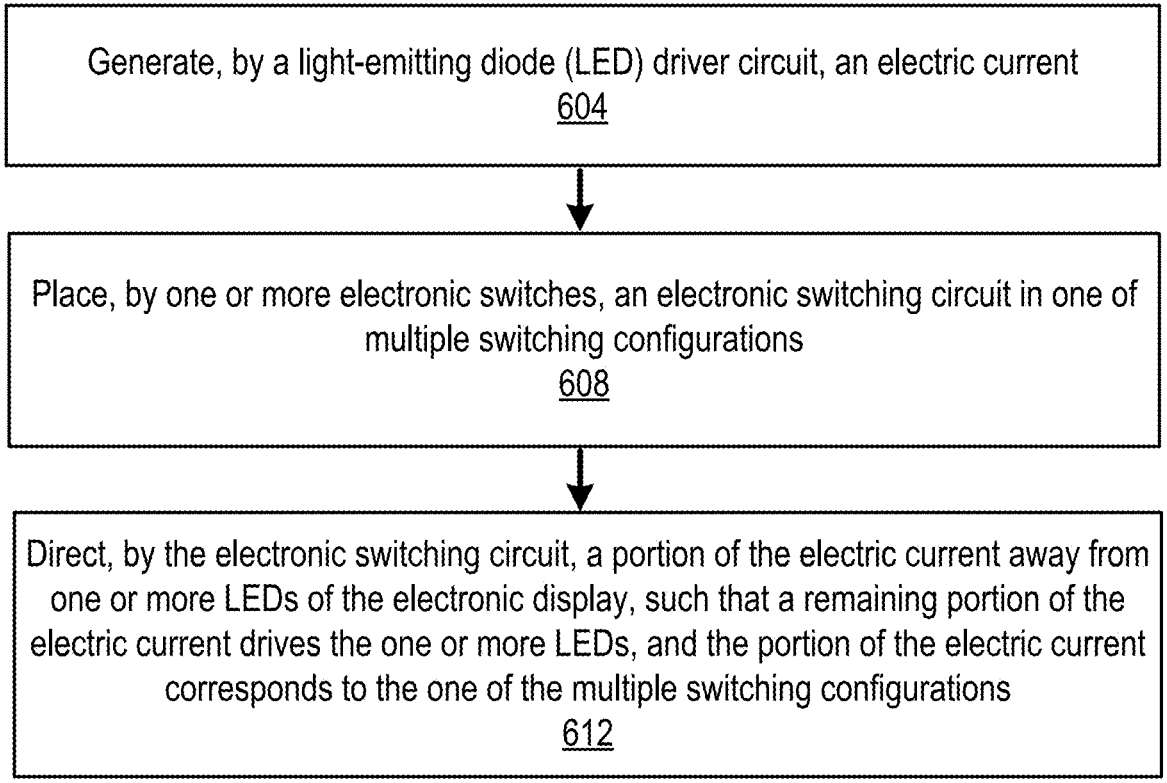
FIG. 6 is a flowchart showing operations in methods for controlling an LED array.

FIG. 6 illustrates a method for controlling an LED array. In some embodiments, the process illustrated in FIG. 6 is performed the apparatus illustrated in FIG. 1. In other embodiments, the process illustrated in FIG. 6 is performed by other apparatuses, such as the apparatuses illustrated in FIG. 2, 3, or 5.

An LED driver circuit (for example, the LED driver circuit 108) generates 604 an electric current (for example, the electric current 116). The LED driver circuit 108 and the electric current 116 are illustrated and described in more detail with reference to FIG. 1. The electric current 116 is for powering one or more LEDs (for example, the one or more LEDs 112) of an LED array. The one or more LEDs 112 are illustrated and described in more detail with reference to FIG. 1.

One or more electronic switches (for example, the electronic switch 120) place 608 an electronic switching circuit (for example, the electronic switching circuit 128) in one of multiple switching configurations. The electronic switch 120 and the electronic switching circuit 128 are illustrated and described in more detail with reference to FIG. 1. The electronic switching circuit 128 includes a resistor 124. The electronic switching circuit 128 is electrically connected to the one or more LEDs 112. When the electronic switch 120 is open, the electronic switching circuit 128 is placed in a first switching configuration in which the electric current 116 flows through the one or more LEDs 112 to power them on one at a time.

The electronic switching circuit 128 directs 612 a portion (for example, the portion 132) of the electric current 116 away from the one or more LEDs 112 of the LED array. A remaining portion (for example, the remaining portion 136) of the electric current 116 drives the one or more LEDs 112. The portion 132 of the electric current 116 corresponds to the switching configuration that the 128 is placed in. Each LED has a first brightness responsive to being driven by the electric current 116. Hence, the minimum brightness limit of the LED array, when the electronic switching circuit 128 is not used, corresponds to the minimum limit on the electric current 116. Each LED has a second brightness responsive to being driven by the remaining portion 136 of the electric current 116. Hence, the minimum brightness limit of the LED array, when the electronic switching circuit 128 is used, corresponds to the minimum limit on the remaining portion 136 of the electric current 116. Hence, the second brightness is less than the first brightness, and the minimum brightness limit of the LED array can be reduced when the electronic switching circuit 128 is used compared to when the electronic switching circuit 128 is not used.

FIG. 7 illustrates a method for controlling an LED array. In some embodiments, the process illustrated in FIG. 7 is performed the apparatus illustrated in FIG. 4.

A controller circuit (for example, the controller circuit 400) places 704 a first programmable LED driver circuit (for example, the first programmable LED driver circuit 412) in one of a first set of configurations. The controller circuit 400 and the first programmable LED driver circuit 412 are illustrated and described in more detail with reference to FIG. 4. For example, the controller circuit 400 generates control signals 408 that place the first programmable LED driver circuit 412 in each of the first set of configurations. The first programmable LED driver circuit 412 is electrically connected to one or more LEDs (for example, the one or more LEDs 436) and configured to power the one or more LEDs 436. The one or more LEDs 436 are illustrated and described in more detail with reference to FIG. 4.

In each of the first set of configurations, the first programmable LED driver circuit 412 generates 708 a first electric current 420 to power the one or more LEDs 436. The first electric current 420 corresponds to the configuration that the first programmable LED driver circuit 412 is placed in. The first electric current 420 is illustrated and described in more detail with reference to FIG. 4.

The controller circuit 400 places 712 a second programmable LED driver circuit (for example, the second programmable LED driver circuit 416) in a second one of a second set of configurations. The second programmable LED driver circuit 416 is illustrated and described in more detail with reference to FIG. 4. For example, the controller circuit 400 generates control signals 404 that place the second programmable LED driver circuit 416 in each of the second set of configurations. The second programmable LED driver circuit 416 is electrically connected to the one or more LEDs 436 and configured to power the one or more LEDs 436.

In each of the second set of configurations, the second programmable LED driver circuit 416 generates 716 a second electric current 424 to power the one or more LEDs 436. The second electric current 424 corresponds to the configuration that the second programmable LED driver circuit 416 is placed in.

An electrical network (for example, the electrical network 432) combines 720 the first electric current 420 and the second electric current 424 into a third electric current 428 to drive the one or more LEDs 436 of the LED array. A brightness of each LED varies in accordance with the first electric current 420 and each configuration that the first programmable LED driver circuit 412 is placed in. The brightness of each LED also varies in accordance with the second electric current 424 and each configuration that the second programmable LED driver circuit 416 is placed in. By controlling the configurations that the first programmable LED driver circuit 412 and the second programmable LED driver circuit 416 are placed in, the controller circuit 400 adjusts the brightness of the LED array.

In some configurations, a controller circuit places a first programmable LED driver circuit in one of a first set of configurations. The first programmable LED driver circuit generates a first electric current corresponding to the one of the first set of configurations. A controller circuit places a second programmable LED driver circuit in a second one of a second set of configurations. The second programmable LED driver circuit generates a second electric current corresponding to the second one of the second set of configurations. An electrical network combines the first electric current and the second electric current into a third electric current to drive one or more LEDs of the LED array.

In some configurations, placing the first programmable LED driver circuit in the one of the first set of configurations adjusts the first electric current. Placing the second programmable LED driver circuit in the second one of the second set of configurations adjusts the second electric current.

In some configurations, each LED of the one or more LEDs has a first minimum brightness responsive to being driven by the first electric current. Each LED of the one or more LEDs has a second minimum brightness responsive to being driven by the second electric current. Each LED of the one or more LEDs has a third minimum brightness responsive to being driven by the third electric current. The third minimum brightness equals a lesser of the first minimum brightness and the second minimum brightness.

In some configurations, each LED of the one or more LEDs has a first maximum brightness responsive to being driven by the first electric current. Each LED of the one or more LEDs has a second maximum brightness responsive to being driven by the second electric current. Each LED of the one or more LEDs has a third maximum brightness responsive to being driven by the third electric current. The third maximum brightness equals a greater of the first maximum brightness and the second maximum brightness.

In some configurations, a brightness of each LED of the one or more LEDs varies in accordance with each configuration of the first set of configurations. The brightness of each LED of the one or more LEDs varies in accordance with each configuration of the second set of configurations.

In some configurations, the one or more LEDs include a first LED having a first color and a second LED having a second color. The first color is different from the second color.

In some configurations, the controller circuit adjusts a brightness of each LED of the one or more LEDs of the LED array within one frame cycle of the LED array.

In some configurations, the controller circuit synchronizes a change to a brightness of each LED of the one or more LEDs of the LED array to an output of the LED array.

The invention claimed is:

1. A device configured to emit light, the device comprising:
    a light-emitting diode (LED) driver circuit configured to generate an electric current;
    a LED array comprising one or more LEDs electrically connected to the LED driver circuit; and
    an electronic switching circuit electrically connected to an LED of the one or more LEDs and configured to:
        be placed in one of a plurality of switching configurations; and
        direct a portion of the electric current away from the LED, such that a remaining portion of the electric current drives the LED, and the portion of the electric current corresponds to the one of the plurality of switching configurations, wherein the electronic switching circuit comprises:
            a plurality of electronic switches electrically connected in a switch parallel configuration; and
            a plurality of resistors electrically connected in a resistor parallel configuration, each electronic switch of the plurality of electronic switches electrically connected to one or more corresponding resistors of the plurality of resistors.

2. The device of claim 1, wherein, when the electronic switching circuit is in use, each LED of the LED array is configured to have a first brightness responsive to being driven by the electric current, and each LED of the LED array is configured to have a second brightness responsive to being driven by the remaining portion of the electric current, the second brightness less than the first brightness.

3. The device of claim 1, wherein a brightness of each LED of the LED array is configured to vary in accordance with each switching configuration of the plurality of switching configurations.

4. The device of claim 1, wherein:
    one or more of the plurality of electronic switches is configured to place the electronic switching circuit in one of the plurality of switching configurations; and
    one or more of the plurality of resistors is electrically connected to one or more of the plurality of electronic switches and configured to direct the portion of the electric current to a port of the LED driver circuit, such that the portion of the electric current from the one or more of the plurality of resistors and the remaining portion of the electric current driving the one or more LEDs combine at the port of the LED driver circuit.

5. The device of claim 1, wherein the plurality of electronic switches comprises N electronic switches, and the plurality of switching configurations comprises 2N switching configurations, wherein N is greater than or equal to 1.

6. The device of claim 1, wherein the plurality of resistors comprises one or more variable resistors.

7. The device of claim 1, wherein the electric current is in a range from 20 mA to 400 mA, and the remaining portion of the electric current is in a range from 0 mA to 380 mA.

8. The device of claim 1, wherein the LED has a first color and an other of the one or more LEDs has a second color different from the first color.

9. The device of claim 8, wherein the first color is red and the second color is green.

10. A method for modulating light output from a device, the method comprising:
  generating, by an LED driver circuit, an electric current;
  placing, by one of a plurality of electronic switches electrically connected in a switch parallel configuration, an electronic switching circuit in one of a plurality of switching configurations, wherein the electronic switching circuit is electrically connected to an LED array; and
  directing, by the electronic switching circuit, a portion of the electric current away from an LED of the LED array, such that a remaining portion of the electric current drives the LED, and the portion of the electric current directed away from the LED corresponds to the one of the plurality of switching configurations,
  wherein the electronic switching circuit comprises:
    the plurality of electronic switches, and
    a plurality of resistors, wherein the plurality of resistors are electrically connected in a resistor parallel configuration, and each electronic switch of the plurality of electronic switches is electrically connected to one or more corresponding resistors of the plurality of resistors.

11. The method of claim 10, wherein, when the electronic switching circuit is in use, each LED of the LED array is configured to have a first brightness responsive to being driven by the electric current, and each LED of the LED array is configured to have a second brightness responsive to being driven by the remaining portion of the electric current, the second brightness less than the first brightness.

12. The method of claim 10, wherein a brightness of the LED array is configured to vary in accordance with each switching configuration of the plurality of switching configurations.

13. The method of claim 10, further comprising:
  directing, by one or more of the plurality of resistors, the portion of the electric current to a port of the LED driver circuit; and
  combining, by an electrical network, the portion of the electric current from the one or more of the plurality of resistors and the remaining portion of the electric current driving the one or more LEDs at the port of the LED driver circuit.

14. The method of claim 10, wherein the LED has a first color and an other of the one or more LEDs has a second color different from the first color.

15. The method of claim 14, wherein the first color is red and the second color is green.

* * * * *